United States Patent [19]

Tregoning

[11] 4,187,832
[45] Feb. 12, 1980

[54] COSMIC AND SOLAR RAY HOT WATER HEATER

[76] Inventor: Robert H. Tregoning, 57 Foxon Hill Rd., East Haven, Conn. 06513

[21] Appl. No.: 913,577

[22] Filed: Jun. 7, 1978

[51] Int. Cl.$^2$ .............................................. F24J 3/02
[52] U.S. Cl. ...................................... 126/443; 126/450
[58] Field of Search ................ 126/270, 271; 237/1 A

[56] References Cited

U.S. PATENT DOCUMENTS

| | | | |
|---|---|---|---|
| 2,167,576 | 7/1939 | Kiser | 126/271 |
| 2,213,894 | 9/1940 | Barry | 126/271 |
| 2,402,326 | 6/1946 | Harkness | 126/271 |
| 4,086,911 | 5/1978 | Futch | 126/271 |

Primary Examiner—James C. Yeung

[57] ABSTRACT

A hot water heater, which is bombarded with cosmic and solar rays that strike our atmosphere, so as to transfer energy from the rays to the heater; the heater including a vacuum pyrex glass container of pentagonal shape when viewed from above, the container being placed upon a base, and enclosing a tubular coil, through which water or other fluids is pumped, so as to absorb the cosmic and solar ray energy, in order that heated fluid, leaving the heater, is thus utilized for various practical purposes.

4 Claims, 7 Drawing Figures

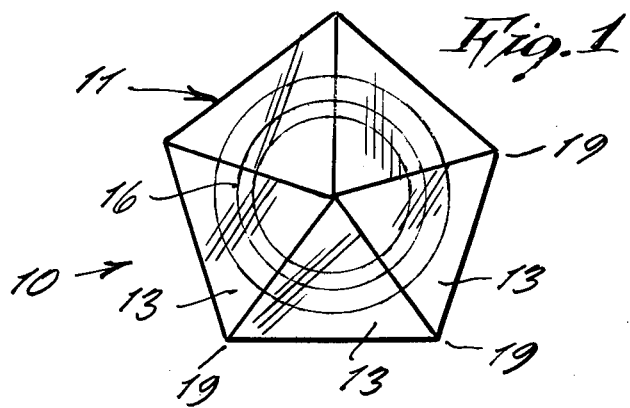
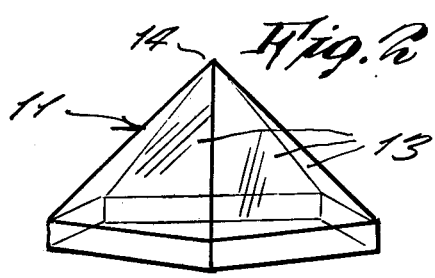
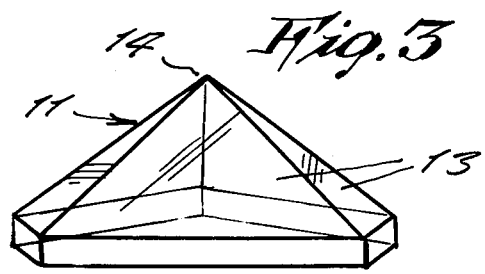
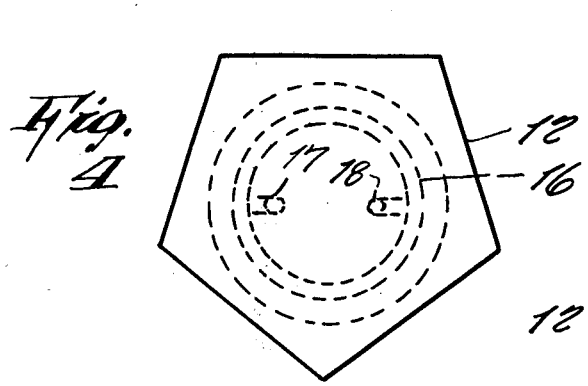
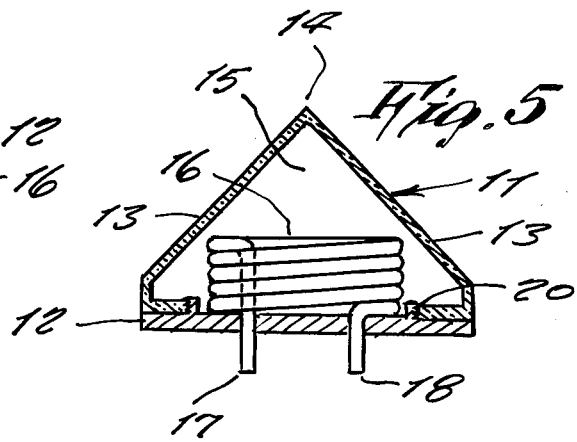
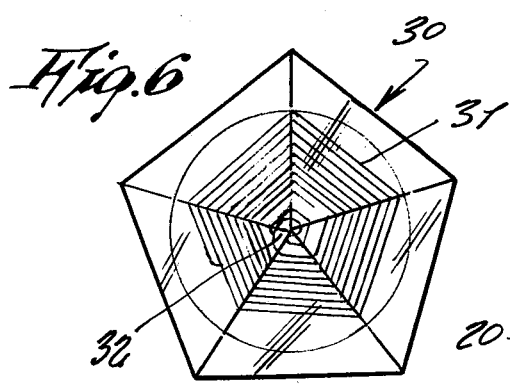
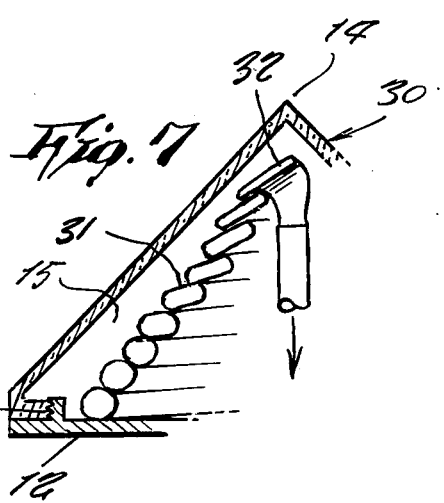

COSMIC AND SOLAR RAY HOT WATER HEATER

This invention relates to a hot water heater that utilizes cosmic and solar ray energy. The primary function is to trap the energetic cosmic rays and utilize the solar rays when available.

There is a steady rain of charged particles, moving at nearly the speed of light, which fall upon the Earth at all times and from all directions. These particles, which have become known as "cosmic rays," are the nuclei of ordinary atoms stripped from their electrons; for the vast majority of cosmic rays, the nuclei are those of hydrogen (but may be heavier nuclei, such as those of oxygen). Most cosmic rays therefore consist of charged protons. It must also be noted that these charged nuclei are the primary cosmic rays which strike our upper atmosphere. Before the discovery of cosmic rays, the particles of highest energy known to man were those emitted in the spontaneous decay of radioactive atoms. In efforts to duplicate the effects of cosmic rays in the laboratory, physicists developed accelerators capable of achieving energies in particles 10,000 times those characteristic of natural radioactivity. Cosmic rays have a broad spectrum of energies, ranging from thousands to billions of electron volts (one electron volt, eV, is defined as the energy acquired by an electron when accelerated by a potential difference of one volt). Cosmic ray particles having energies of $6 \times 10^{19}$ eV are known to exist, and there is no indication that this is the peak, and may have energies almost beyond comprehension. The progeny of cosmic ray particles, beginning with collisions in the upper atmosphere, includes such particles as mu mesons, heavy mesons, antiprotons, and negative electrons. The local cosmic rays consist of mu mesons, electrons, photons, and neutrinos.

In the present invention these cosmic and solar rays provide the heating force to the apparatus described herein and illustrated in the drawing.

It is a principal purpose of the present invention to provide a hot water heater, which is struck by cosmic and solar rays, so that energy from these two rays is utilized for practical purposes.

Another object is to provide a cosmic and solar ray water heater, which can be utilized to supply heat for a household, or which, upon a larger scale, can be used to produce steam, which will be utilized for producing electricity.

Other objects are to provide a cosmic and solar ray water heater, which is simple in design, inexpensive to manufacture, rugged in construction, easy to use and efficient in operation.

These, and other objects, will be readily evident, upon a study of the following specification, and the accompanying drawing, wherein:

FIG. 1 is a top view of the cosmic ray hot water heater;

FIG. 2 is a front perspective view of a pyrex enclosure thereof, shown without a water coil;

FIG. 3 is a side view thereof;

FIG. 4 is a bottom view of the heater;

FIG. 5 is a side, cross-sectional view thereof;

FIG. 6 is a top view of a modified design of the invention, and

FIG. 7 is a fragmentary, vertical side cross-sectional view of FIG. 6.

Referring now to the drawing in greater detail, and more particularly to FIGS. 1 through 5 thereof at this time, the reference numeral 10 represents a cosmic and solar ray hot water heater, according to the present invention, wherein there is an enclosure or container 11, that is placed upon a base 12. The container is made of pyrex glass, that is made approximately three times the thickness of ordinary window glass. The container is made with five sides 13 which are angularly disposed, at forty-five degrees respective to a horizon, and each of the five sides comprises a flat panel which taper to a common point or apex 14, so that when viewed from above, the container is of pentagonal shape.

The container, together with the base, encloses a vacuum chamber 15, inside which there is placed a tubular coil 16. Opposite ends of the coil protrude downwardly, through the base, so as to form intake and outlet ports 17 and 18, for a liquid, such as water, so as to flow through the coil.

In operative use, it is now evident that cosmic and solar ray energy, passing through the pyrex container, will heat up the coil, so that liquid flowing through the coil is thus heated up, and which is pumped outwardly of the coil, so as to be utilized for practical purposes.

In positioning the heater 10, it is to be noted that any one of the five points 19 of the device are positioned so as to be towards the magnetic poles, on either side of the equator, and the container can then take advantage, in full, of the sun's energy during the day on three sides—East, South, and West. At the equator of the earth, an equilibrium, or six sided container, may be utilized for the same effect.

As shown in FIG. 5, it is to be noted that the container may be secured to the base, by means of a screw thread 20, as shown.

Reference is now made to FIGS. 6 and 7 of the drawing, wherein there is a modified design of cosmic and solar ray hot water heater 30, which is generally similar to the above described cosmic and solar ray hot water heater 10; but in this modified design, there is a water coil 31, which is not circular in shape, as above described, but which is five-sided, similar to the shape of the container, in order to match the container enclosure. The coil, additionally, tapers upwardly toward a top apex 32, in a pyramidal configuration, and so that a maximum amount of the coil is contained within the heater. Additionally, it will be noted, that such coil is also located closer to the surface of the container, in order to absorb a maximum cosmic and solar ray energy.

Additionally, as clearly shown in FIG. 7, the coil is not made from a tubing which is uniformly a same in cross-sectional configuration. It will be noted, that the lowermost turns of the coil are circular in cross-section, and this cross-section gradually becomes flattened out, as the turns approach the apex 32 of the coil. Accordingly, the uppermost turns of the coil become more flat and thin, so that water, moving therethrough, is thus more intensely bombarded with cosmic and solar ray energy, so as to be more thoroughly heated thereby. In this design, accordingly, the water passing through the coil gets a more intensive heating, as it approaches the upper turns of the coil, so that, when the water leaves the coil, it is then at its maximum heat. All of the water, moving through the upper turns of the coil, is thus very close to the coil's surface, in order to absorb a large amount of the cosmic and solar ray energy. This is more efficient than the liquid moving through the center of a circular coil. The flattened turns at the upper end of the coil carry still a same amount of water volume as the lowermost circular turns thereof. The uppermost turns overlap each other also, for extra heat absorption. Thus, a design of coil is made for increased efficiency.

While various changes may be made in the detail construction, it is understood that such changes will be within the spirit and scope of the present invention, as is defined by the appended claims.

What I now claim is:

1. A cosmic and solar ray hot water heater, comprising, in combination, a pentagonal-shaped container, mounted upon a base, and enclosing a tubular coil having an inlet and an outlet at opposite ends; said container being made of pyrex glass from five flat panels which are three times the thickness of ordinary window glass, and said container tapering upwardly at a 45 degree angle to an apex center; said coil being pentagonal in shape and tapering upwardly pyramidically to an apex; and said coil being circular in cross section at one end and flattened at its opposite end, and an entire length of said coil between said ends being gradually changed between said circular and flattened configurations.

2. The combination as set forth in claim 1, wherein said coil outlet is at said apex thereof.

3. The combination as set forth in claim 2, wherein said flattened end of said coil is at said apex.

4. The combination as set forth in claim 3, wherein a portion of said coil overlaps its turns.

* * * * *